Jan. 2, 1945.  A. J. HERSEY ET AL  2,366,259
CAR WHEEL
Filed Jan. 5, 1942
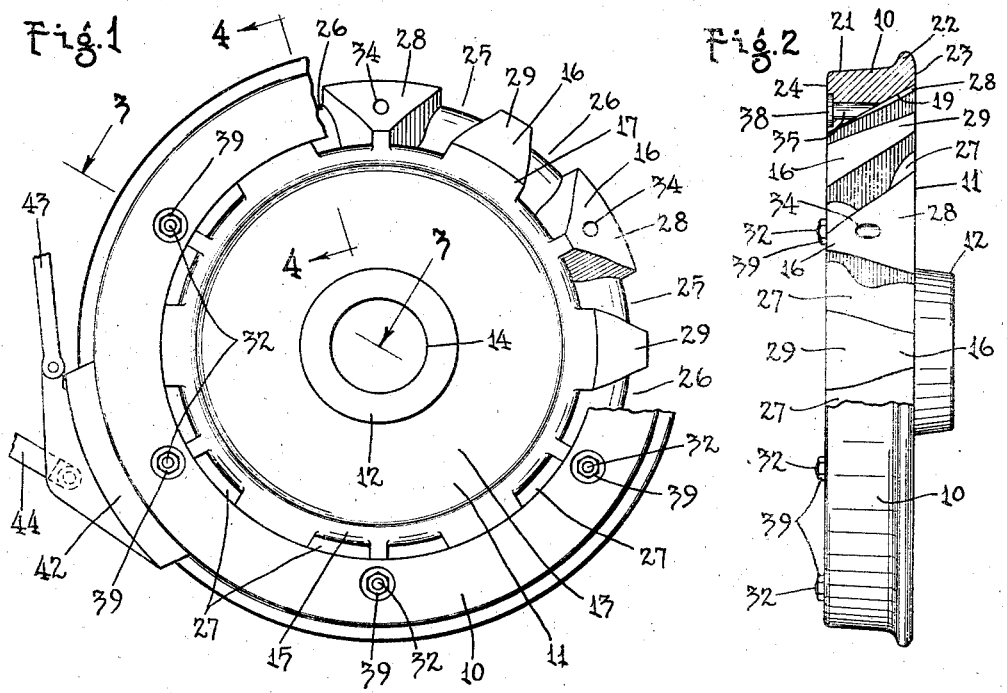
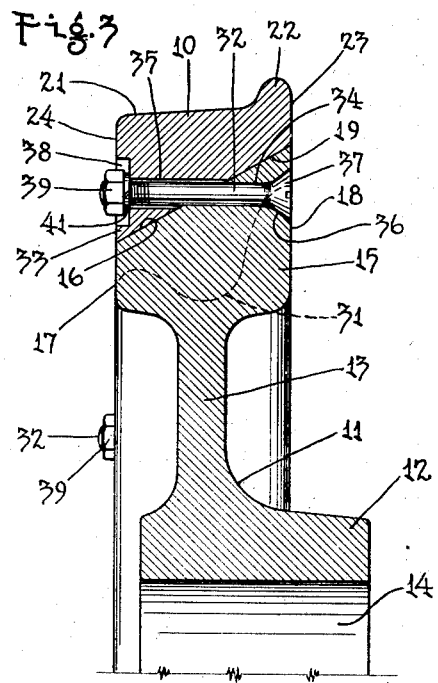
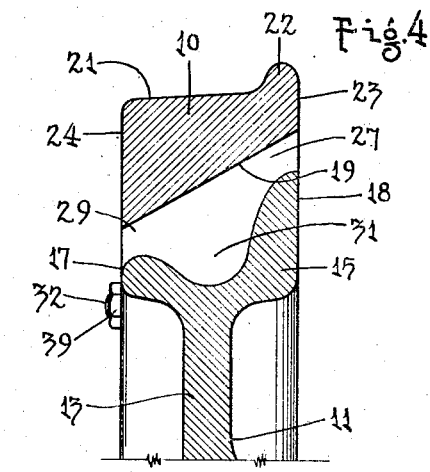
Inventors
Arthur J. Hersey and
Charles L. Madden
By Caswell & Lagaard
Attorneys Patented Jan. 2, 1945

2,366,259

UNITED STATES PATENT OFFICE 2,366,259

CAR WHEEL

Arthur J. Hersey and Charles L. Madden, Minneapolis, Minn.

Application January 5, 1942, Serial No. 425,652

15 Claims. (Cl. 295—30)

Our invention relates to improvements in car wheels and has for an object thereof to provide a simple, durable and relatively inexpensive construction utilizing a wheel center having a rim and a tire demountably supported on the rim.

Another object of the invention resides in providing a construction, whereby the tire, upon expansion under heat, may move axially of the rim and be thereby deprived of looseness relative to the wheel center.

A further object of the invention resides in constructing the rim of the wheel with an external beveled bearing surface and the tire with a corresponding internal beveled bearing surface engaging the beveled surface of the rim, and in providing resilient means for urging the tire to move along said bearing surface of the rim upon the expansion of the tire.

A still further object of the invention resides in providing bolts extending through the rim and tire and in providing resilient means encircling said bolts for causing movement of the tire relative to the rim upon expansion of the tire.

An additional object of the invention is to provide a car wheel of the present nature constructed to provide for the air-cooling of the tire and wheel center, whereby is prevented the loosening of the wheel center on its axle by expansion and, whereby, the expansion of the tire relative to the rim of said wheel center is effectively minimized.

A feature of the invention resides in providing a number of passageways extending through the rim for conducting air through the wheel, and in arranging the passageways to spiral alternately in opposite directions.

A further feature of the invention resides in constructing said passageways by forming grooves across the rim which are closed therealong by the beveled bearing surface of the tire, whereby both the tire and rim are in heat-conducting relation with respect to the air passing through the passageways.

Another object of the invention resides in the arrangement of said grooves so as to form lugs therebetween and in running the bolts for attaching the tire to the rim through said lugs.

A still further object of the invention resides in forming the wheel center to provide recesses or bays issuing radially inward from said passageways for causing the air passing through the passageways to whirl and thus be brought into intimate contact with the heat-exchange surfaces of the passageways.

Other objects of the invention reside in the novel combination and arrangement of parts and in the details of construction hereinafter illustrated and/or described.

In the drawing:

Fig. 1 is an end elevational view of a car wheel with a portion of the tire broken away and illustrating an embodiment of my invention.

Fig. 2 is a side elevational view of the structure shown in Fig. 1.

Fig. 3 is a diametral sectional view taken on line 3—3 of Fig. 1 and drawn to a greater scale.

Fig. 4 is a view similar to Fig. 3 taken on line 4—4 of Fig. 1.

In the operation of trains, considerable frictional heat is developed in the tire of a wheel against which braking force is applied, which sometimes causes the tire to become dangerously loose on the rim and sometimes causes the wheel center to become dangerously loose on the axle upon which it is shrunk. The present invention provides a car wheel in which compensation is had for movement of the tire with respect to the wheel center, caused by expansion, and in which expansion of the tire relative to the rim and expansion of the wheel center relative to the wheel axle are minimized.

Our invention comprises a wheel center 11 on which is demountably supported a tire 10. Said wheel center 11 is cast from suitable metal and consists of a hub 12 and a web 13 extending outwardly therefrom. The wheel axle (not shown) is received in the bore 14 of hub 12 and said wheel center is shrunk on said axle in the usual manner. Perimetrically of the web 13 is a rim 15 which is formed with an outer beveled bearing surface 16, said bearing surface being of the least diameter at the outer end surface 17 of the rim and of greatest diameter at the inner end surface 18 of the rim.

The tire 10 is constructed of steel or other suitable material and is formed with an inner beveled surface 19 of the same angularity as the surface 16 of the rim 15. The surface 19 engages the bearing surface 16 of the rim 15 and supports the tire on the wheel center 11. The tire 10 has a tread 21 which rides a railway rail and has the usual rail engaging flange 22 at the inner end surface 23 of the tire. The outer end surface 24 of the tire 10 is disposed substantially in the plane of the outer surface 17 of the rim 15.

The rim 15 is constructed with alternately disposed grooves 25 and 26 therein, which extend transversely of the rim and which open laterally in a direction radially outward from said rim. These grooves, open at their ends, are bridged by the tire 10 and form passageways 27 which extend through the wheel and have heat-exchange surfaces in both the tire and rim. The grooves 25 spiral in a clockwise direction as viewed in Fig. 1, while the grooves 26 spiral in a counterclockwise direction, as viewed in Fig. 1. By means of this construction, two sets of lugs 28 and 29 are formed between the grooves, which lugs are trapezoidal in form. The wider end surfaces of the lugs 28 lie in the plane of the surface 18 of rim 15, while the wider end surfaces of the lugs 29 lie in the plane of the surface 17 of the rim. The passageways 27 are deepened to form depressions 31 intermediate their ends, which cause a swirling of the air passing therethrough. This has the effect of causing the air passing through the passageways 27 to make thorough and intimate contact with the heat-exchange surfaces of the wheel.

The tire 10 is attached to the wheel center 11 by means of a number of bolts 32. These bolts extend through the lugs 28 and through the innermost portion 33 of the tire 10. To accommodate these bolts, holes 34 are formed in the lugs 28 which extend through the beveled surface 16 thereof, and which register with corresponding holes 35 in the portion 33 of the tire 10. The holes 35 are slightly larger in diameter than the bolts 32, so that radial movement of the tire 12 may be had relative to the rim 15 without subjecting the bolts to shearing stresses. The holes 34 are countersunk, as indicated at 36, to receive the heads 37 of the bolts 32, while counterbores 38 are formed in the tire 10 at the ends of the holes 35 to receive the nuts 39 of the bolts 32. Encircling each bolt 32 is a spring washer 41 which is received under the nut 39 and engages the tire 10 at the bottom of the counterbore 38. By means of the spring washers 41, the tire 10, even though increased in diameter by expansion, is maintained with its beveled bearing surface 19 in engagement with the beveled bearing surface 16 of the rim 15.

In Fig. 1, we have represented an ordinary brake shoe 42, which is adapted to engage the tread 21 of the tire 10. This brake shoe is provided in customary manner with the usual hanger 43 and operating rod 44 therefor.

The operation of the invention is as follows: In the installation of the tire 12 upon the wheel center 11, said tire is placed over the rim 15 with the beveled surface 19 in engagement with the beveled surface 16 and with the holes 35 in registration with the holes 34. The bolts 32 are then inserted in said registering holes and the spring washers 41 and nuts 39 are applied to said bolts. The nuts 39 are tightened sufficiently to cause the bearing surface 19 of the tire 10 to set snugly upon the bearing surface 16 of the rim 15. The tire 10, thus closing the grooves 25, 26 laterally thereof, completes passageways 27. As the wheel revolves with the brake shoe 42 applied thereto, the tire 10 will be frictionally heated by said shoe and the wheel center will be heated by conduction from the tire. Before this heat can be dissipated sufficiently, the tire may expand and tend to become loose upon the rim 15. However, the spring washers 41 engage the tire 10 and urge it in an axial direction along the beveled bearing surface 16, said surface and the beveled surface 19 of the tire 10 coacting to preclude any looseness between tire and rim. The tire 10 in such case, would move toward the right, as viewed in Fig. 3. As the wheel rotates, air is caused by centrifugal force to circulate through the passageways 27 from left to right as seen in Fig. 4, the depressions 31 in the passageways 27, producing a swirling movement of the air in said passageways which causes the entire volume of air to make intimate contact with the heat transfer surfaces of the wheel. Thus, effective cooling of the tire 10 and wheel center 11 is produced. Since the grooves 25 and 26 are disposed in spiraling relation, it will become evident that an injector action is produced at the outer ends of certain of the grooves, depending upon the direction of rotation of the wheel, which augments the circulation of the air through said passageways 27.

The advantages of our invention are manifest. An extremely simple and practical construction is provided which will effectively dissipate heat generated by braking. By means of our improved construction, demountable tires, non-loosening by expansion under frictional heat, may be used, and when a tire becomes worn, it may be replaced without discarding the wheel center. Due to the coacting beveled surfaces 16, 19 of the rim 15 and tire 10, the expansion of the tire is compensated for and said tire maintained firmly seated upon the rim. With the passageways 27 arranged in the manner shown, air is induced to flow through the same by centrifugal force and in certain of the passageways such flow is augmented by injector action. The air in passing through the passageways 27 is caused to swirl and thus in its entirety intimately contact the heat transfer surfaces of said passageways. These passageways being formed partly by the tire 10 and partly by the rim 15, cause cooling of both the tire and rim and prevent any appreciable transfer of heat from the tire to the hub of the wheel center on the wheel axle. The dimensions of the bolt holes 35 in the tire 10 allow sufficient radial movement of the tire freely to compensate for the expansion of the same. By arranging the grooves in the rim 15 so that they spiral alternately in opposite directions, the lugs between the grooves have widened portions for the accommodation of the bolts for attaching the tire to the rim.

What we claim is:

1. In a car wheel, a rim having an external beveled bearing surface, a tire encircling said rim and having a corresponding internal beveled surface engaging the beveled surface of the rim, said rim having passageways extending therethrough, the walls of said passageways radially remote from the axis of the wheel extending in the direction of the beveled surfaces of said rim and tire, said passageways conducting air through the wheel from one side of the wheel to the other to cool the wheel.

2. In a car wheel, a rim having an external beveled bearing surface, a tire encircling said rim and having a corresponding internal beveled surface resting upon the beveled surface of the rim, said rim having passageways extending therethrough in the direction of the beveled surfaces of said rim and tire, said passageways conducting air through the wheel from one side of the wheel to the other to cool the wheel, said passageways alternately spiraling in opposite directions.

3. In a car wheel, a rim having a number of transverse grooves extending through the periphery thereof and forming lugs therebetween, said lugs having external beveled faces contained in the surface of a cone, a tire encircling said rim and having an internal beveled surface engaging the beveled faces of the lugs, and bolts extending through certain of said lugs and through said tire for attaching the tire to the rim, said grooves in conjunction with the beveled surface of the tire forming air passageways through the wheel for bringing the air passing therethrough into direct heat exchange relation with respect to both the tire and rim.

4. In a car wheel, a rim having a number of transverse grooves extending through the periphery thereof and forming lugs therebetween, said lugs having external beveled faces contained in the surface of a cone, a tire encircling said rim and having an internal beveled surface engaging the beveled faces of the lugs, and bolts extending through certain of said lugs and through said tire for attaching the tire to the rim, said grooves in conjunction with the beveled surface of the tire forming air passageways through the wheel for bringing the air passing therethrough into direct heat exchange relation with respect to both the tire and rim, certain of said grooves having recesses therein extending radially inwardly from the beveled surface of the tire and disposed intermediate the lateral surfaces of the rim.

5. In a car wheel, a rim having a number of transverse grooves of substantially uniform width extending through the periphery thereof and forming lugs therebetween, said lugs having external beveled faces contained in the surface of a cone, a tire encircling said rim and having an internal beveled surface engaging the beveled faces of the lugs, and bolts extending through certain of said lugs and through said tire for attaching the tire to the rim, said grooves in conjunction with the beveled surface of the tire forming air passageways through the wheel for bringing the air passing therethrough into direct heat exchange relation with respect to both the tire and rim, certain of said grooves intermediate the ends thereof being deepened to cause the air passing therethrough to swirl and to be brought into intimate contact with the heat exchange surfaces of the passageways.

6. In a car wheel having a number of transverse air passageways therethrough, the walls of said passageways radially remote from the axis of the wheel being axially biased relative to said axis and alternately spiraling in opposite directions.

7. In a car wheel having a number of transverse air passageways extending therethrough, the walls of said passageways radially remote from the axis of the wheel being axially biased relative to said axis and spirally disposed across the wheel.

8. In a car wheel having a number of transverse air passageways extending therethrough, some of said passageways having the walls thereof radially remote from the axis of the wheel axially biased relative to said axis and some of said passageways being spirally disposed across the wheel.

9. In a car wheel, a rim, said rim having a number of transverse air passageways extending therethrough, the surfaces of said passageways radially remote from the axis of the wheel being longitudinally biased relative to said axis and the surfaces of said passageways opposite said first surfaces being recessed intermediate their ends.

10. In a car wheel, a wheel center having an externally beveled rim, an internally beveled tire removably applied to the rim, said wheel having passageways therein extending from side to side thereof for conducting air therethrough to cool both wheel center and tire, said passageways consisting of grooves formed in said rim and bridged by the beveled surface of said tire.

11. In a car wheel, a rim having a number of transverse grooves extending through the periphery thereof and forming lugs therebetween, said lugs having external beveled faces contained in the surface of a cone, a tire encircling said rim and having an internal beveled surface engaging the beveled faces of the lugs, every other groove spiraling in one direction and the intervening grooves spiraling in the opposite direction to make alternate lugs wider at that portion of the rim of greatest diameter, and bolts extending through said widened portions of said lugs and through said tire for attaching the tire to the rim.

12. In a car wheel, a rim, a demountable tire encircling said rim, said wheel having passageways extending therethrough, said passageways being formed in part by said tire and in part by said rim and serving to conduct air through the wheel from one side thereof to the other to cool the same, the walls of the passageways radially remote from the axis of the wheel being axially biased relative thereto to induce by centrifugal force the flow of air through said passageways.

13. In a car wheel including a rim and a tire as members thereof, the rim having an external beveled surface, the tire encircling said rim and having a corresponding internal beveled surface engaging the beveled surface of the rim, said rim and tire being each formed with a set of holes extending therethrough transversely thereof, each hole of the one set registering with a hole of the other set, clamping bolts fitted to the rim and tire and extending through said holes, there being one bolt to each pair of registering holes, said bolts securing said tire to said rim, each of the holes in one of said members being of a greater transverse dimension radially of the wheel than the corresponding dimension of the bolt therein to admit of the circumferential expansion of the tire relative to the rim, and resilient means acting upon said members and through said bolts upon the expansion of the tire to exert a force tending to shift the tire axially of the rim and maintain contact between said beveled surfaces of said tire and rim, said tire being so shiftable in response to such force and being relatively reversely self-shiftable against such force upon its circumferential contraction relative to said rim.

14. In a car wheel, a rim having an external beveled surface, a tire encircling said rim and having a corresponding beveled surface engaging the beveled surface of the rim, said rim and tire being each formed with a set of holes extending therethrough transversely thereof, each hole of the one set registering with a hole of the other set, clamping bolts fitted to said rim and tire and extending through said holes, there being one bolt to each pair of registering holes, said bolts securing said tire to said rim, each of the holes in said tire being of a greater diameter than the diameter of the bolt therein to admit of the circumferential expansion of the tire relative to the rim, expansion washers encircling said bolts, said washers being backed against said tire and acting through said bolts upon the rim to exert a force tending to shift the tire axially of the rim upon the expansion of said tire and thereby maintain contact between said beveled surfaces of said tire and rim, said tire being so shiftable in response to such force and being relatively reversely self-shiftable against such force upon its circumferential contraction relative to said rim.

15. In a car wheel, a rim having an external beveled surface, a tire encircling said rim and having a corresponding beveled surface engaging the beveled surface of the rim, said rim and tire being each formed with a set of holes extending therethrough transversely thereof, each hole of the one set registering with a hole of the other set, clamping bolts fitted to said rim and tire and extending through said holes, there being one bolt to each pair of registering holes, said bolts securing said tire to said rim, each of the holes in said tire being of a greater transverse dimension radially of the tire than the corresponding dimension of the bolt therein to admit of the circumferential expansion of the tire relative to the rim, resilient means carried by the bolts and acting therethrough upon tire and rim to exert a force tending to shift the tire axially of the rim upon the circumferential expansion of said tire and thereby maintain contact between said beveled surfaces of said tire and rim, said tire being so shiftable in response to such force and being relatively reversely self-shiftable against such force upon its circumferential contraction relative to said rim.

ARTHUR J. HERSEY.
CHARLES L. MADDEN.